T. J. SODEN.
Ice-Cream Freezer.
No. 199,476. Patented Jan. 22, 1878.
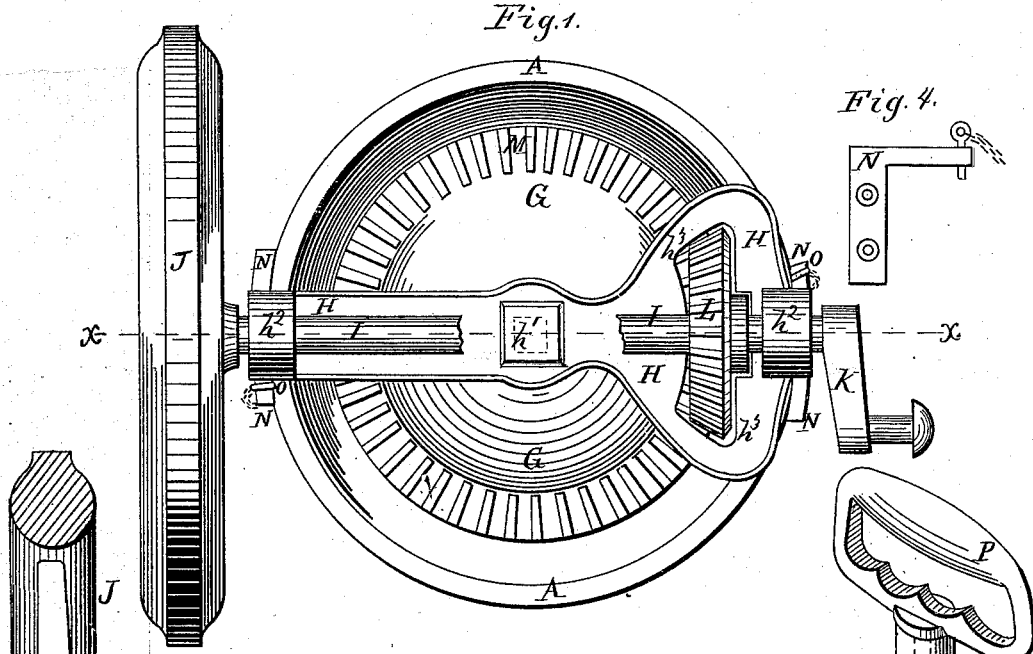
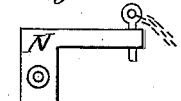
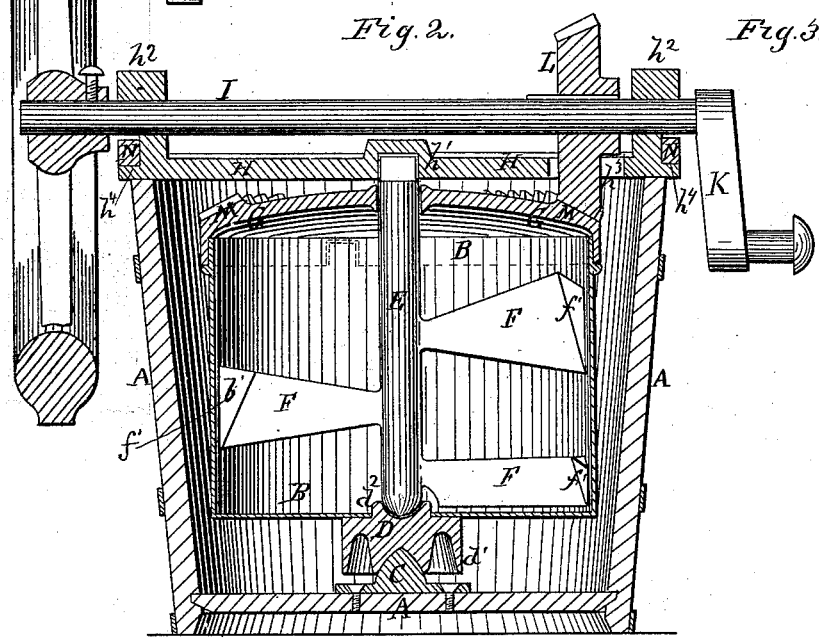
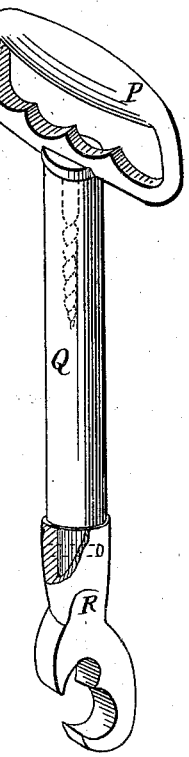
WITNESSES:
Henry N. Miller
J. H. Scarborough
INVENTOR:
T. J. Soden.
BY Munn & Co
ATTORNEYS.

UNITED STATES PATENT OFFICE.

THOMAS J. SODEN, OF BROOKLYN, NEW YORK.

IMPROVEMENT IN ICE-CREAM FREEZERS.

Specification forming part of Letters Patent No. 199,476, dated January 22, 1878; application filed November 10, 1877.

*To all whom it may concern:*

Be it known that I, THOMAS J. SODEN, of Brooklyn, in the county of Kings and State of New York, have invented a new and useful Improvement in Ice-Cream Freezers, of which the following is a specification:

Figure 1 is a top view of my improved machine, part being broken away to show the construction. Fig. 2 is a vertical section of the same, taken through the line $x\ x$, Fig. 1. Fig. 3 is a detail perspective view of the handle. Fig. 4 is a detail view of the locking-bar.

Similar letters of reference indicate corresponding parts.

The object of this invention is to furnish an improved ice-cream freezer which shall be simple in construction, convenient in use, and effective in operation, producing a superior article with much less labor and much less annoyance than when ordinary freezers are used.

The invention will first be described in connection with the drawing, and then pointed out in the claim.

A represents the pail or tub that receives the cylinder B and the freezing-mixture, and which may be of any desired or convenient size. To the center of the bottom of the pail A is attached a pivot, C, with a rounded upper end to enter a socket in the block D, secured to the center of the bottom of the cylinder B. The socket-block D is made with a downwardly-projecting ring-flange, $d^1$, around its lower end, to protect the pivot from the ice and salt, and thus cause the cylinder B to revolve more freely. Upon the center of the top of the socket-block D is formed a projection, $d^2$, which passes up through a hole in the center of the bottom of the cylinder B, and has its upper end concaved to receive the rounded lower end of the knife-shaft E. The knife-shaft E passes down through the center of the cylinder B, and has a series of knives, F, formed upon it. The knives F are arranged spirally upon the shaft E, and made wider at their outer ends, are set with their lower edges inclined forward, and have forwardly-projecting flanges $f'$ formed upon their outer ends.

By this construction the knives F throw the cream upward and inward, thoroughly mixing it, while the flanges $f'$ keep it from adhering to the sides of the cylinder B, so that the machine will produce a uniform and very superior article.

The upper end of the knife-shaft E passes up through a hole in the center of the cylinder-cover G, and is squared off to enter a square socket, $h^1$, formed to receive it in the lower side of the center of the bar H. The bar H has a projection formed upon the upper side of its center, so that the socket $h^1$ may be made the proper depth, and may be covered and protected from ice and salt without making the bar H too heavy. The ends of the bar H rest upon the upper edge of the opposite sides of the pail A, and have lugs or bearings $h^2$ formed upon their upper sides, to receive the journals of the shaft I. To one end of the shaft I is attached a fly-wheel, J, to give steadiness of motion to the machine. To the other end of the shaft I is attached, or upon it is formed, a crank, K, to receive the handle for giving motion to the shaft I. One end of the bar H is widened, and has a cross-slot, $h^3$, formed in it for the bevel-gear wheel L to project through. The bevel-gear wheel L is attached to the shaft I, projects through the slot $h^3$ in the bar H, and its teeth mesh into the teeth of the bevel-gear wheel M, formed upon or attached to the cover G. The cover G is made with a downwardly-projecting ring-flange, which overlaps the outer side of the upper part of the cylinder B, and has one or more notches formed in it, to receive projections or lugs formed upon or attached to the said cylinder B, to prevent the said cover from turning upon the said cylinder.

Upon the outer side of the ends of the bar H are formed transverse grooves $h^4$, to receive the horizontal arms of the right-angled bars N, attached to the upper part of the opposite sides of the pail A. The ends of the bar H are kept from slipping off the arms of the bars N by the pins O, which are inserted in holes in the ends of the said arms, and are prevented from being lost when not in use by being connected with pail A by short chains.

By this construction the bar H and its attachments may be attached and detached by sliding it upon the edge of the pail A, so that its grooved ends may pass on and off the horizontal arms of the bars N. By this construction, also, by turning the crank K, the cylinder B will be revolved, while the pail A and the knife-shaft and knives E F will remain stationary, so that the cream will be thoroughly mixed, and will be evenly frozen in all parts of the cylinder.

The machine may be operated by a handle, P Q R, of such a length that the operator may stand erect or sit upon a chair while working it.

The handle is formed of a wooden bar, Q, having a metal handle, P, attached to one end, and a metal hook, R, attached to its other end.

The handle P and the hook R may be cast with screws, to be screwed into the ends of the bar Q, as shown, with respect to the handle, in Fig. 3; or they may be cast with sockets to receive the ends of the bar Q, or tenons formed upon said ends, as shown, with respect to the hook, in Fig. 3.

The hook R may be formed with a single cavity, to push or pull against the crank-pin; or with two cavities, one to push and the other to pull against the crank-pin. The latter construction is shown in the drawings.

Having thus described my invention, I claim as new and desire to secure by Letters Patent—

The bar H, which slides upon the edge of pail, and is provided with grooved ends that pass on and off the horizontal arms of bars N, as and for the purpose set forth.

THOMAS J. SODEN.

Witnesses:
JAMES T. GRAHAM,
C. SEDGWICK.